(12) United States Patent
Komowski

(10) Patent No.: US 7,625,273 B2
(45) Date of Patent: Dec. 1, 2009

(54) AIR CHANNEL FLAP AND FLOW GUIDING DEVICE

(75) Inventor: Michael Komowski, Weil der Stadt (DE)

(73) Assignee: Behr GmbH & Co. KG, Stuttgart (DE)

( * ) Notice: Subject to any disclaimer, the term of this patent is extended or adjusted under 35 U.S.C. 154(b) by 91 days.

(21) Appl. No.: 10/555,886

(22) PCT Filed: May 7, 2004

(86) PCT No.: PCT/EP2004/004921

§ 371 (c)(1),
(2), (4) Date: Nov. 7, 2005

(87) PCT Pub. No.: WO2004/098924

PCT Pub. Date: Nov. 18, 2004

(65) Prior Publication Data

US 2007/0042700 A1   Feb. 22, 2007

(30) Foreign Application Priority Data

May 7, 2003 (DE) .................... 103 20 645

(51) Int. Cl.
*B60H 1/00* (2006.01)
*F24F 7/007* (2006.01)

(52) U.S. Cl. .............. 454/121; 454/69; 454/126; 454/156; 137/875; 165/204

(58) Field of Classification Search .......... 454/69, 454/121, 126, 139, 145, 156; 137/625.44, 137/872, 875; 165/204
See application file for complete search history.

(56) References Cited

U.S. PATENT DOCUMENTS

| | | | | |
|---|---|---|---|---|
| 3,807,631 A | | 4/1974 | Mohr | |
| 4,267,880 A | * | 5/1981 | Jacquet | 165/41 |
| 4,290,455 A | * | 9/1981 | Honda et al. | 137/855 |
| 4,534,275 A | * | 8/1985 | Hofmann | 454/152 |
| 4,615,262 A | * | 10/1986 | Taniguchi | 454/124 |
| 5,106,018 A | * | 4/1992 | Loup | 237/12.3 B |
| 5,181,553 A | * | 1/1993 | Doi | 165/203 |
| 5,775,407 A | * | 7/1998 | Inoue | 165/42 |
| 6,319,112 B2 | * | 11/2001 | Komowski | 454/139 |
| 6,412,755 B2 | * | 7/2002 | Ito | 251/173 |
| 6,458,027 B1 | * | 10/2002 | Stiehl | 454/162 |
| 6,488,077 B1 | * | 12/2002 | Arold | 165/42 |

(Continued)

FOREIGN PATENT DOCUMENTS

DE    42 14 862 C1    5/1993

(Continued)

*Primary Examiner*—Steven B McAllister
*Assistant Examiner*—Patrick F. O'Reilly, III
(74) *Attorney, Agent, or Firm*—Foley & Lardner LLP

(57) ABSTRACT

The invention relates to a flap (10) for air channels provided with a multi-flow conduit arranged downstream with respect to said flap, airflows (45, 46) being limited by flow guiding elements (56, 57), and thereby separated from each other. According to said invention, the axis of rotation (11) of the flap is arranged on the edge, the flap being transversally projected with respect to the axis and divided into two flap segments which are arranged one after another. Each flap segment is provided with at least one sealing device (14) for airtight seating against a passage opening.

9 Claims, 4 Drawing Sheets

U.S. PATENT DOCUMENTS

| | | |
|---|---|---|
| 6,523,805 B2 | 2/2003 | Kato et al. |
| 7,546,868 B2 * | 6/2009 | Klein et al. ................. 165/203 |
| 2006/0090890 A1 * | 5/2006 | Klein et al. ................. 165/203 |

FOREIGN PATENT DOCUMENTS

| | | | |
|---|---|---|---|
| DE | 198 28 469 A1 | | 1/1999 |
| DE | 101 61 997 A1 | | 6/2003 |
| DE | 10261037 A1 | * | 2/2004 |
| EP | 461421 A1 | * | 12/1991 |
| EP | 1 070 611 A1 | | 1/2001 |
| EP | 1717070 A2 | * | 11/2006 |
| FR | 2 480 685 | | 10/1981 |
| FR | 2556290 A1 | * | 6/1985 |
| FR | 2591950 A1 | * | 6/1987 |
| JP | 07285313 A | * | 10/1995 |
| JP | 10264638 A | * | 10/1998 |
| WO | WO 2004014676 A1 | * | 2/2004 |

* cited by examiner

AIR CHANNEL FLAP AND FLOW GUIDING DEVICE

BACKGROUND OF THE INVENTION

The present invention relates to a flap for air ducts and to a flow guide device, such as is generally known.

In air ducts, flaps are used to switch multi-conduit flow lines located downstream of the flap. The flaps may in this case serve, on the one hand, for a continuous variable distribution of the air streams between the downstream conduits or else also for a complete alternating changeover of the fluid path of the air stream between the various conduits.

Thus, correspondingly designed flaps have sealing devices which, in cooperation with throughflow orifices present on the flow guide devices, can provide leaktight bearing contact, so that conduits can be closed off in a fluidtight manner.

Such flaps for controlling the ducts take up a specific construction length in the throughflow direction of the air. This construction length is determined essentially by the dimensions of the flap and by the construction space required for adjusting the flap into various positions. Furthermore, the construction space required in this case depends on how large a design the flap has. The larger the design of the flap, the longer is the pivoting space required for the flap. However, the situation is that large flap sizes have the advantage that the cross section of coverable throughflow orifices increases with the flap size. The reason for designing air lines with as large duct cross sections as possible is that, for the same volumetric flow, a lower flow velocity of the air stream is then required. This allows a better provision of laminar airflows which cause substantially few flow noises than turbulent flows. Where flow guide devices are concerned, it is fundamentally necessary to avoid the generation of flow noise, since this is transferred, together with the emerging air stream, into the ventilated space.

On the other hand, it is also troublesome when large construction spaces are taken up for switching devices. Large construction spaces and free flow lengths making it possible to arrange a flap of large size are not always available in the regions where switchable flow routing is to be provided.

This problem arises particularly in the field of vehicle ventilation and air conditioning devices. There are often only small construction spaces available in vehicles. The devices which are used for the ventilation and air conditioning of a vehicle are to have as small a build and as compact a design as possible. In this context, in air conditioning systems in vehicles, it is customary first to route the entering air stream as a whole via an evaporator which cools down and dehumidifies the air stream. An initial state of the inflowing air stream to be defined as simply as possible for the air conditioning of the vehicle interior is generated. The evaporator is then followed, in the flow path of the air stream, by a bypass line which leads past a heating body, and, parallel to this bypass line lies the flow path or the conduit leading through the heating body. By means of switchable flaps, the air coming from the evaporator and conditioned in terms of temperature and humidity is divided into part streams which are distributed to the two conduits. Downstream of the heating body and, if appropriate, of other devices, the two conduits are combined again, and the two part streams are intermixed. The temperature and air humidity of the mixed stream occurring are conditioned by the position of the flaps dividing the air stream into part streams. Thus, by means of the flap position, the division of the ratio of the two part streams in relation to one another is varied. Precisely where arrangements of this type are concerned, the construction space required between the evaporator and the heating body must be kept as small as possible. Within this construction space, it must be possible to arrange the flap and for the latter to perform its function as a control element for dividing into part air streams.

SUMMARY OF THE INVENTION

The object of the invention is to provide a flap for air ducts which makes it possible to switch or divide an air stream to or between a plurality of conduits and, on the other hand, takes up as small a flow length as possible in the direction of flow of the air stream.

The object is achieved by means of a flap, a switchable multi-conduit flow guide device constituting a preferred arrangement using such a flap.

A flap is used for air ducts in which a multi-conduit flow line is formed downstream of the flap, the individual conduits being delimited and separated from one another by flow guide means. The conduits have a throughflow orifice. The flap has a pivot axis which serves for the pivotable mounting of the flap in the housing in which multi-conduit flow conduction takes place. Sealing devices for airtight bearing contact against at least one throughflow orifice are formed on the flap. The flap serves for the switchable conduction of the airflow with respect to the plurality of conduits. According to the invention, the pivot axis of the flap is formed at the edge, the flap projecting transversally from said pivot axis and being divided into two flap segments lying one behind the other. Each of the flap segments has at least one sealing device for airtight bearing contact against a throughflow orifice. The flap has a contour which is curved concavely, as seen as a whole in the direction of arrangement of the flap segments one behind the other.

What is achieved by the configuration of the flap according to the invention is that the pivotable arrangement of the flap and the construction space required for switchability between the conduits and taken up in the direction of flow are kept as small as possible. It thus becomes possible, in particular, to arrange such a flap so that, as seen in the direction of flow, a short distance between individual functional elements is occupied. It therefore becomes possible, particularly in the direction of flow, to have switching regions of very short build.

According to an advantageous embodiment of the invention, each flap segment has exactly one sealing device for airtight bearing contact against a throughflow orifice. According to an advantageous development, the sealing devices are arranged on sides of the flap which are different from one another. Preferably the flap segment distal with respect to the pivot axis has the sealing device on the inside of the generally concave contour. The advantage of such arrangements is in this case the resulting simple and space-saving configuration of the flap. If the sealing device of the proximal flap segment lies on the outside of the concave contour, then, in a position oblique with respect to the direction of flow of the air stream, on the one hand, good flow conduction over the surface of the flap can take place and, on the other hand, a good division of the inflowing air stream into part streams can also take place. It is in this case, in particular, possible that one conduit, which covers the throughflow orifice having the distal flap segment and, arranged on the latter, the sealing device located on the inside with respect to the concave curvature, projects into the space then as it were enclosed by the flap and consequently precedes the position of the throughflow orifice of the bypass duct. This possibility, in particular, leads to embodiments in the direction of flow which have a very short build.

According to an advantageous embodiment of the flap according to the invention, the contour of the flap is of essentially ellipsoidal design. The ellipsoidal design makes it possible to maintain a continuous curvature of the flap over its entire extent. According to a developing embodiment, in this case, the region of greater curvature is formed at the distal end of the flap. This region is assigned to one flap element, a sealing device of essentially planar orientation being inscribed into the contour of the ellipse in this flap segment. In this case, preferably, lateral side walls are provided, which connect the sealing device to the flap segment at the lateral ends with respect to the extent of the pivot axis.

A further embodiment of the invention provides for the flap segments to be at an angle to one another. The individual flap segments are in this case preferably of planar design and have a sealing device on one side. The flap segments are in this case arranged at angle to one another such that the internal angle is smaller than 180° in order to maintain the concave contour. According to a preferred embodiment, in this case, the internal angle is smaller than 120° and, in particular, is in the region of approximately 90°. As close as possible an approximation to an internal angle of 90° makes it possible, as a rule, to have arrangements of particularly short build in which functional elements of a flow conduit can project well into the pivoting range of the flap. In this case, this length is predetermined, in particular, by the length of extent of the proximal axial element. The length of the distal flap segment in this case then determines the distance which must lie between the start of the associated conduit and the upstream end of preceding components, so that a suitable pivoting movement can be executed. Developing embodiments of planar plate segments may provide for these to have a camber in the region of the inner surface, in which case this camber may preferably be designed in the form of the surface area of a cylinder.

According to another development of the invention, there is provision for the flap to be produced by the multicomponent injection molding method, the sealing device being designed as a sealing profile or sealing lip and being injection molded in one piece onto the remaining body of the flap. The sealing profiles or sealing lips are intended for sealing bearing contact against sealing surfaces formed on the side of the flow guide means. In this case, in particular, it is possible that, by a continuous variation in the addition of softeners, the sealing device is produced from basically the same material as the flap, and a continuous transfer of the material properties is thus achieved.

A switchable multi-conduit flow guide device is advantageously configured such that the pivot axis of the flap is articulated on flow guide means so as to be spaced apart in the direction of flow from the throughflow orifice of one of the conduits and on the outside with respect to the latter. In this case, articulation preferably takes place in such a way that, in an end position of the pivoting movement about the pivot axis, the distal flap segment comes into sealing bearing contact against the throughflow orifice of this conduit.

This type of arrangement of the flap within the flow guide device achieves a preferred design which has a short build in the direction of flow.

According to an advantageous embodiment, the flow guide device is shaped in such a way that it bears sealingly against the throughflow orifice of another conduit in the other position of the flap forming a limit. According to an advantageous embodiment, the contour of the flow guide means of this other conduit is shaped, in the region lying upstream of the throughflow orifice, as seen in the direction of flow, in such a way that there is a pivoting position in which the contour of the flap follows, at least in regions, the contour of the flow guide means. This measure affords the possibility that the flap bears with its outer contour against flow guide means. The flow guide means serve in this portion as a receptacle for the flap.

According to preferred embodiments, the flap serves as the conductor of an airflow between two conduits, one conduit containing functional elements and the other conduit forming a bypass with respect to these functional elements. According to a developing embodiment, the functional elements are heat exchangers or active heating elements for the air stream.

BRIEF DESCRIPTION OF THE DRAWINGS

Moreover, the invention is also explained in more detail below by means of the exemplary embodiment illustrated in the drawing in which.

DETAILED DESCRIPTION OF THE INVENTION

Figure 1:
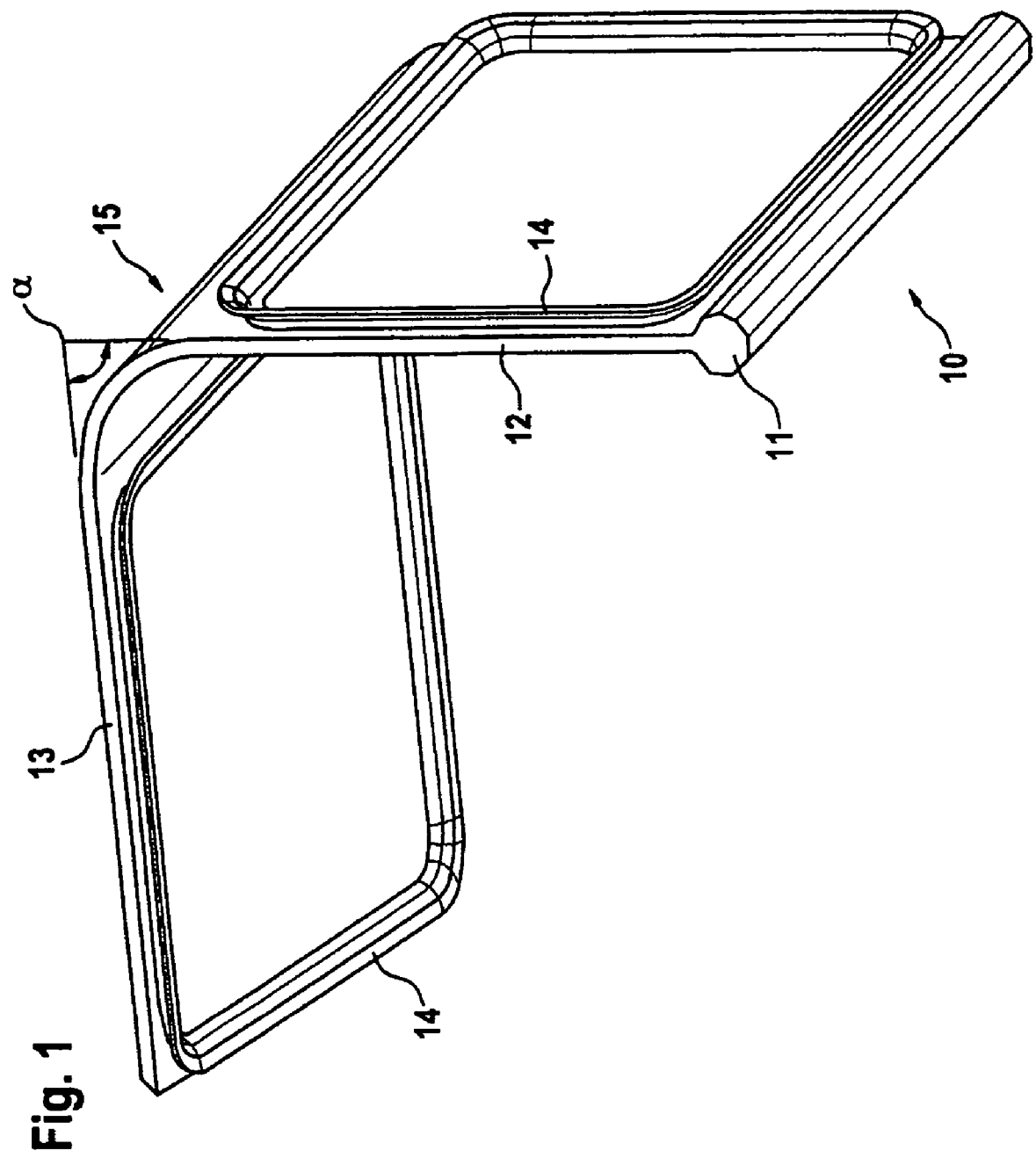
FIG. 1 shows a perspective illustration of an exemplary embodiment of a flap according to the invention.
Figure 2:
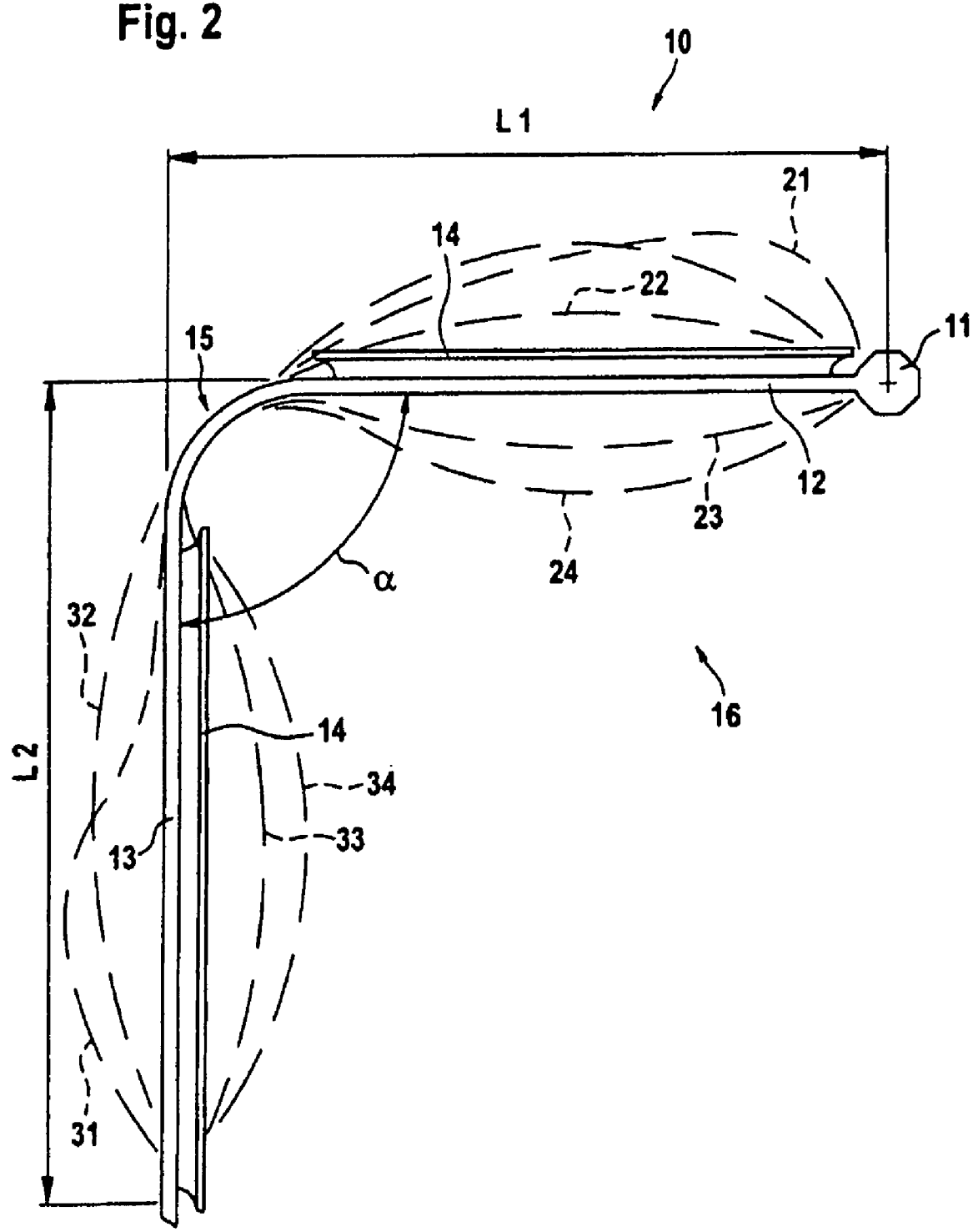
FIG. 2 shows a cross-sectional illustration through the flap according to FIG. 1 and a diagrammatic illustration of other flap profiles.

FIGS. 1 and 2 show a flap 10 respectively in a perspective and in a cross-sectional illustration. The flap 10 is formed from the pivot axis 11 and the projecting flap segments 12 and 13. The flap segment 12 directly adjoins the pivot axis 11 and forms the proximal flap segment 12, while the further flap segment 13 is arranged distally with respect to the pivot axis 11 with respect to the first flap segment 12. Each of the flap segments has a sealing profile 14 which forms a closed contour line on the surface of the corresponding flap segments 12 and 13.

FIG. 1 shows a flap in which the two flap segments 12 and 13 are designed as planar sheetlike elements, and, to produce the generally concave shape, there is formed at the transition between the two elements a bending point 15 at which the two flap segments 12 and 13 have an internal angle α which is smaller than 180°. In the exemplary embodiment illustrated, the internal angle is a right angle.

FIG. 2 shows, as a main illustration, a sectional illustration through the flap 10 shown in FIG. 1. This, too, shows the pivot axis 11, the proximal flap segment 12 and the distal flap segment 13 which is at an angle α to the proximal flap segment. In this case, a region of a bending point 15 is formed.

In addition, the sectional illustration 16 also shows, in each case in dashed illustration, different possibilities for the configuration both of the surface profile and of the sectional profile of the flap. In this case, the surface profiles and sectional profiles illustrated have the characteristic that they all have a common run in the region of the bending point, and therefore a different combination of profiles can be used for the two flap segments 12 and 13. The alternative profiles have been designated by the reference symbols 21 to 24 in the region of the proximal flap segment 12 and by the reference symbols 31 to 34 in the region of the distal flap segment 13. The two profiles 21 and 22 or 31 and 32 thus in each case follow the generally concave camber of the flap 10, while the two alternative profiles 23 and 24 or 33 and 34, in contrast, are at least partially curved convexly. The profiles 33 and 22 in this case supplement one another in such a way that, if in this case the sectional profile of the flap segments 12 and 13 were considered, there would be, overall, an approximately elliptic overall shape of the contour of the flap with its flap segments 12 and 13. Moreover, the run of the surface profile or sectional profile can be adapted essentially to the requirements in respect of the flow bed and to available construction spaces. Flow-optimized adaptation of the surface profile or sectional profile gives rise essentially to a good bearing contact of the sealing profile against the sealing surface surrounding the throughflow orifice on the housing side. This assists the provision of a good sealing function which, in particular, avoids throughflow noises in the event of the formation of gaps between the flap and throughflow orifice. The run of the profiles is as shown in the drawings by the corresponding lines. These illustrations are examples, and alternative runs of the curvature of the flap segments 12 and 13 in terms of both the surface profile and the sectional profile may be envisaged and may be selected essentially freely. Angles α between the proximal flap segment 12 and the distal flap segment 13 which may differ from the right angle shown and, in particular, may lie in the range of between 60° and 120° are likewise possible.

Figure 3:
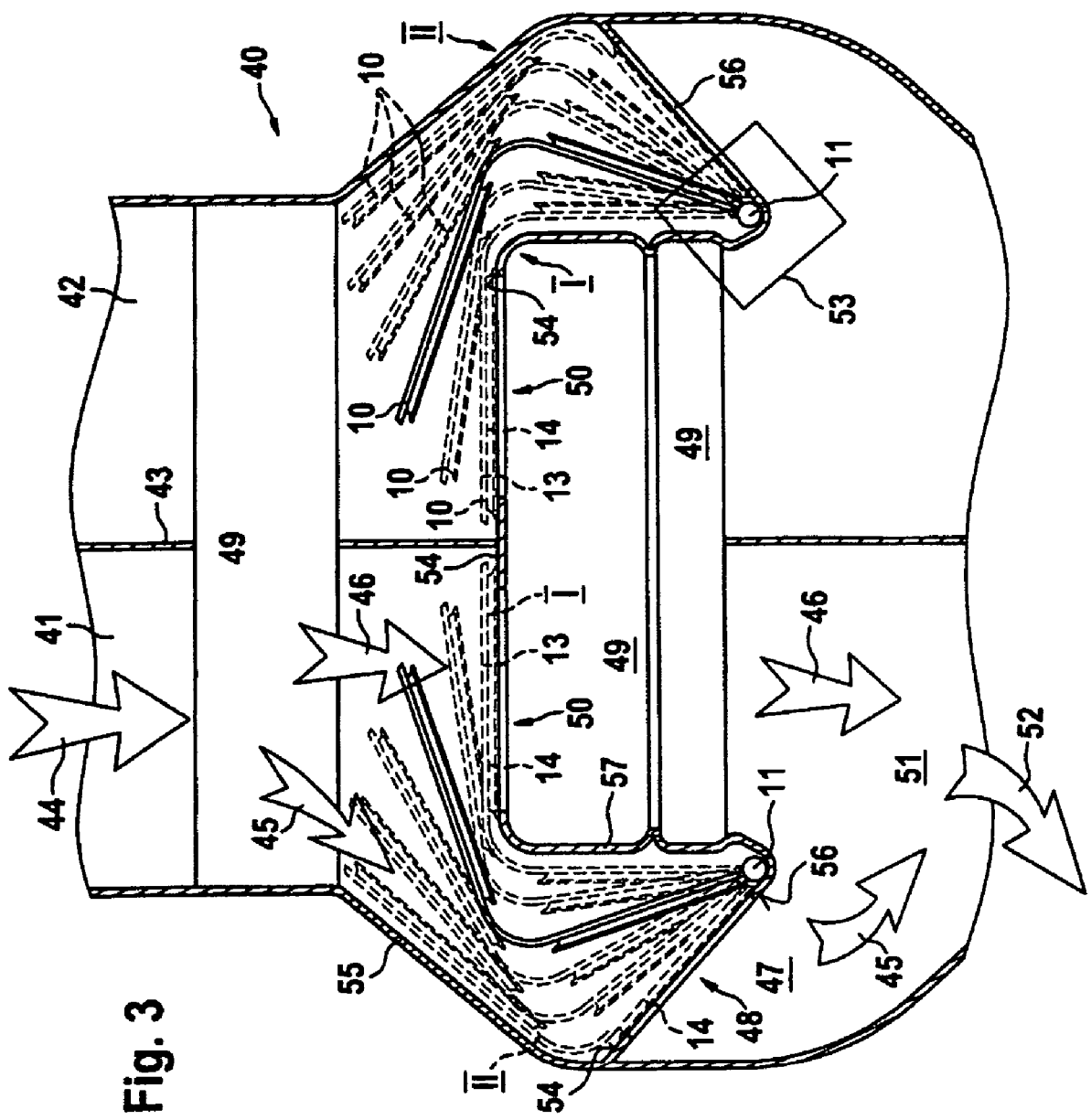
FIG. 3 shows a flow guide device for a vehicle air conditioning system.
Figure 4:
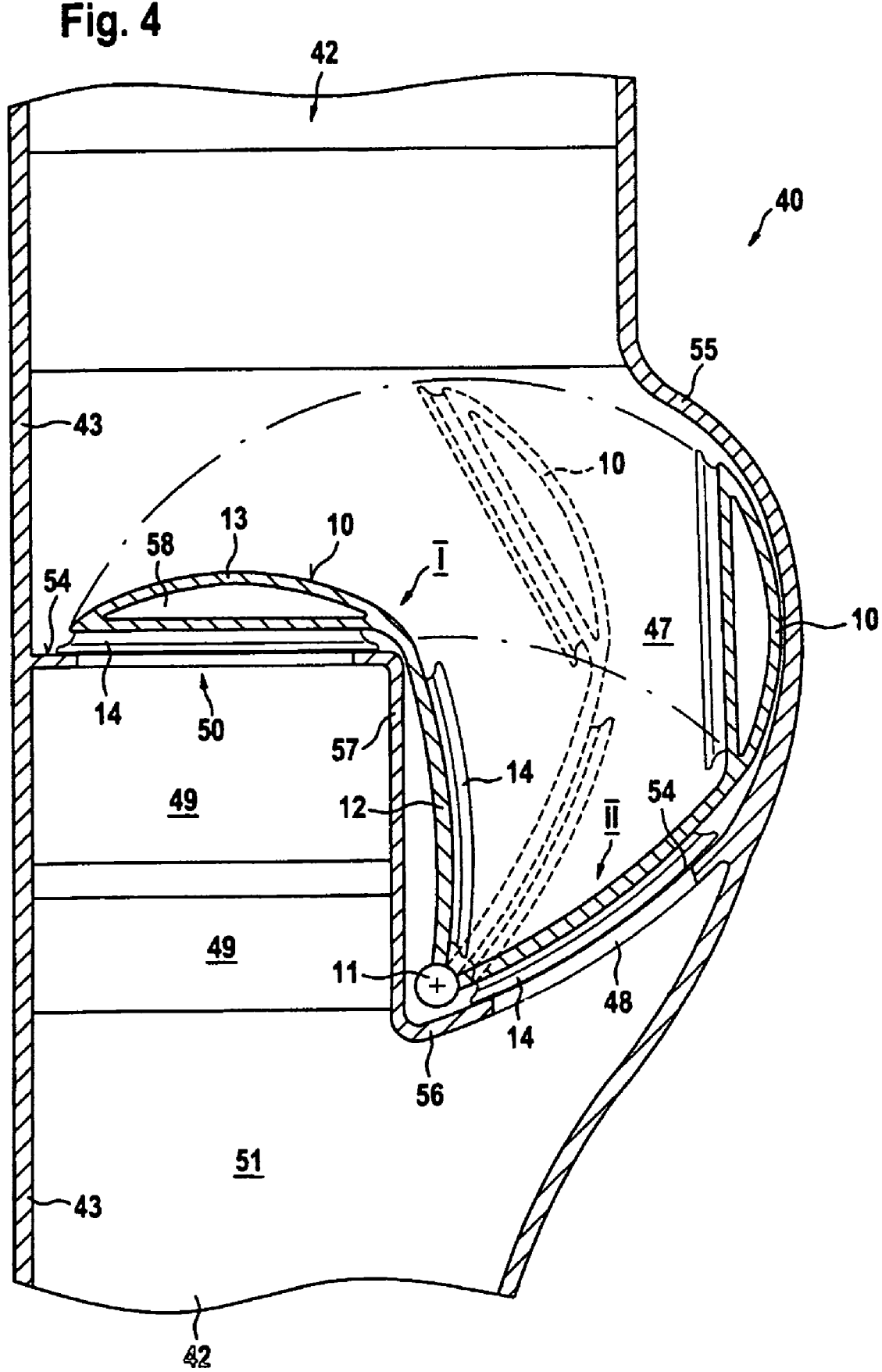
FIG. 4 shows a diagrammatic sectional illustration through a flow guide device for a vehicle air conditioning system with another flap profile.

FIGS. 3 and 4 show in each case an exemplary embodiment of the use of a flap according to the invention in the region of a vehicle air conditioning system 40. In this case, FIG. 3 shows the two ducts 41 and 42 which are separated from one another by a partition 43 and are subsequently assigned to different vehicle sides, while FIG. 4 shows only one duct 42 and the partition 43, since, here too, the construction of the second duct may be designed essentially mirror-symmetrically with respect to the partition 43.

The figures in each case show the arrangement of a flap 10 in different pivoting positions, in each case in one of the ducts 41 and 42. The flap 10 of each of the ducts 41 and 42 serves in this case for dividing an inflowing air stream 44 which is divided into two part streams 45 and 46. For the sake of simplification, in this case, the routing of the air stream and the division into part streams are depicted by corresponding flow arrows only in relation to one duct 41 in FIG. 3, although a corresponding routing of the air streams in the ducts 42, as illustrated in FIG. 3 and FIG. 4, is readily obtained by means of appropriate transfer.

The two part streams meet one another downstream of the different flow path in the region of the collector space 51 and can then be routed as a mixed stream 52, for example, to air nozzles pointing into the vehicle interior and emerge there.

The embodiments of air conditioning systems 40, such as are shown in FIGS. 3 and 4, have the particular feature that the distance between the evaporator (not shown), through which the air stream flows, and the heating body, through which, as a functional element 49, only a part stream 46 flows, is only short in the direction of flow. The possibility of producing a switchable two-duct version with such a small axial construction length is permitted by the flap 10 according to the invention. In principle, in a vehicle air conditioning system, the entire air stream 44 is routed through an evaporator, with the result that the entire air stream supplied is cooled and dried. To control the temperature of the vehicle interior, the air stream conditioned by the evaporator is divided into two part streams 45 and 46, the first part stream 45 being routed through a first duct 47, a bypass with respect to the functional element 49, and the other second part stream 46 being routed through a second duct which is delimited essentially by the functional element 49. Thus, by means of the position of the flap 10, the volume flow ratio of the two part streams 45 and 46 in relation to one another is varied, so that the temperature and air humidity, occurring in the collector space 51, of the mixed stream 52 of the two part streams 45 and 46, downstream of the function element 49, can be controlled or regulated.

The flap can be influenced by means of an actuator 53 which acts on the pivot axis 11 and which is illustrated diagrammatically in the right duct 42 of FIG. 3. Division into part streams takes place by the flap 10 being pivoted into a middle position between the two end positions I and II. In the end position I, the entire volume flow 44 is routed through the bypass 47. In this case, the throughflow orifice 50 is concealed by the distal flap segment 13, the sealing profile 14, which is arranged on the inside with respect to the concave curvature, bearing against a bearing surface 54 which surrounds the throughflow orifice 50. In this case, on account of the flow pressure of the inflowing air stream 44, the distal flap segment 13 is pressed against the throughflow orifice 50, thus resulting in effectively sealing bearing contact.

In the end position II of the flap 10, the proximal flap segment bears against a closing surface 56 which has a throughflow orifice 48 and which delimits the bypass 47 in terms of the throughflow cross section. In this case, the sealing profile 14 of the proximal flap segment 12, said sealing profile being formed on the outside with respect to the concave curvature of the flap 10, bears against sealing surfaces 54 of the closingoff surface 56 which delimits the throughflow orifice 48. Here, too, an inflowing air stream impinges onto that side of the flap segment 12 which faces away from the sealing profile 14, so that pressing of the sealing profile against the sealing surface 54 is achieved by means of the inflowing air stream.

In the intermediate positions illustrated between the two end positions, I and II, the air stream is divided, as indicated by the flow arrows 45 and 46, into part streams which first, conducted by the distal flap segment 13, flow through either the bypass 47 or else the functional element 49, to be precise the heating body and, if appropriate, a further active heating element following the heating body, before the air stream passes into the collector space 51.

FIG. 3 shows in this case the arrangement of two flaps in the embodiment illustrated according to FIG. 1, each of the two flaps being assigned to a duct 41 or 42 of a two-duct air conditioning system. In this case, the partition 43, the housing 55, the closing-off surface 56 and the functional element partition 57 form the flow guide means which separate from one another and delimit the two flow ducts 41 and 42. In this case, in the exemplary embodiment illustrated, the housing 55, which closes off the air conditioning system 40 outwardly, is designed, in this region, in such a way that, in the end position II, the contour of the housing is guided in such a way that the distal flap segment 13 bears essentially against the housing 55. This, in particular, avoids the situation where a part stream is led into the region of the sealing profile 14 between the distal flap segment 13 and housing 55, 50 that an airflow flows in the region of this sealing point, and the risk of the occurrence of an undesirable secondary stream is thus reduced.

FIG. 3 shows a version in which an air conditioning system has two ducts 41 and 42, a flap 10 according to the illustration in FIG. 1 being used in each of the two ducts 41 and 42.

By contrast, FIG. 4 shows an arrangement in which the flap segments 12 and 13 supplement one another to form a continuously curved essentially ellipsoidal contour. In this case, the proximal flap segment has a concave camber in sectional profile, while a cylindrical extent is obtained transversely thereto. By an appropriate configuration and camber of the closing-off surface 56 of the bypass 47, sealing bearing contact of the sealing profile 14 against the assigned sealing surface 54 becomes possible, without further adaptation measures, in spite of the cambered sectional profile.

By contrast, in the region of the distal flap segment 13, in order to complete the surface profile on the front side and the rear side, a sidewall 58 is required in each case, which completes the space between the planar run of the sealing surface 14 and the cambered run of the distal flap segment 13, as seen in the axial direction of the pivot axis 11. The configuration of the device according to FIG. 4 otherwise corresponds to that of FIG. 1, and therefore what was said above applies accordingly to this.

The invention claimed is:

1. A flap for a plurality of air ducts such that multi-conduit flow conduction takes place downstream of the flap in a housing, comprising:
    a pivot axis for a pivotable arrangement in the housing, wherein the pivot axis of the flap is formed at an edge of the flap;
    first and second flap segments which lie one behind the other as the flap projects transversally from the pivot axis;
    a first sealing device located on a first surface of the first flap segment for airtight bearing contact against a first throughflow orifice, wherein the first sealing device forms a closed contour line protruding above and along the first surface; and
    a second sealing device located on a second surface of the second flap segment for airtight bearing contact against a second throughflow orifice, wherein the second sealing device forms a closed contour line protruding above and along the second surface,
    wherein position of the flap serves for switching conduction of air flow,
    wherein the flap has a generally concavely curved contour,
    wherein the generally concavely curved contour of the flap is of essentially ellipsoidal design, and
    wherein a region of greater curvature is formed at a distal end of the flap, wherein the second sealing device of essentially planar orientation is formed into a contour of the ellipsoidal design in the region of greater curvature, and wherein side walls laterally connect the second sealing device to the second flap segment in order to form a fluidtight termination.

2. A switchable multi-conduit flow guide device, comprising:
    a housing;
    conduits delimited by a flow guide means, wherein the conduits comprise a first centrally arranged conduit containing functional elements and second and third bypass conduits provided on each of two sides of the first conduit, wherein the first conduit has two symmetrically arranged throughflow orifices; and
    first and second flaps, wherein the first flap serves for controlling an air stream between one of the two throughflow orifices of the first conduit and the second conduit, wherein the second flap serves for controlling an air stream between the other of the two throughflow orifices of the first conduit and the third conduit, wherein each flap comprises:
        a pivot axis for a pivotable arrangement in the housing, wherein the pivot axis is formed at an edge of the flap;
        proximal and distal flap segments which lie one behind the other as the flap projects transversally from the pivot axis;
        a proximal sealing device located on a first surface of the proximal flap segment for airtight bearing contact with the flap's respective bypass conduit, wherein the proximal sealing device forms a closed contour line protruding above and along the first surface; and
        a distal sealing device located on a second surface of the distal flap segment for airtight bearing contact against the flap's respective throughflow orifice of the first conduit, wherein the distal sealing device forms a closed contour line protruding above and along the second surface,
        wherein the flap has a generally concavely curved contour,
        wherein a substantially constant angular relationship is maintained between the proximal and distal flap segments throughout the range of motion.

3. The flow guide device as claimed in claim 2, wherein each of the proximal and distal flap segments of each flap has exactly one sealing device for airtight bearing contact.

4. The flow guide device as claimed in claim 3, wherein the proximal and distal sealing devices of each flap are arranged on sides of the flap which are different from one another, and wherein the distal flap segment of each flap is distal with respect to the pivot axis and the distal sealing device of each flap is located on the inside of the generally concavely curved contour.

5. The flow guide device as claimed in claim 2, wherein the generally concavely curved contour of each flap is of essentially ellipsoidal design.

6. The flow guide device as claimed in claim 2, wherein the proximal and distal flap segments of each flap are at an angle to one another with an internal angle that is smaller than 180°.

7. The flow guide device as claimed in claim 6, wherein the proximal and distal flap segments of each flap are formed in each case from a planar element having their respective sealing device on one side.

8. The flow guide device as claimed in claim 6, wherein the proximal and distal flap segments of each flap each has a cambered shape in a form of an outer surface area of a cylinder.

9. The flow guide device as claimed in claim 2, wherein each flap is produced by a multicomponent injection molding method, and wherein the proximal and distal sealing devices of each flap are each designed as a sealing profile or sealing lip which comes to bear against a sealing surface formed on a side of the flow guide means.

* * * * *